United States Patent [19]
Verboom et al.

[11] Patent Number: 5,295,127
[45] Date of Patent: Mar. 15, 1994

[54] OPTICAL DATA RECORDER WITH SEGMENT SYNCHRONIZATION MARKS

[75] Inventors: Johannes J. Verboom, Black Forest; Fred N. Wamble, Colorado Springs, both of Colo.

[73] Assignee: North American Philips Corporation, New York, N.Y.

[21] Appl. No.: 994,574

[22] Filed: Dec. 22, 1992

[51] Int. Cl.$^5$ .......................... G11B 3/90; G11B 27/36; G11B 7/00; G11B 3/70
[52] U.S. Cl. .......................................... 369/58; 369/59; 369/111; 369/275.3
[58] Field of Search .................. 369/54, 59, 105, 109, 369/111, 47, 58, 275.1, 275.3, 275.4; 360/39, 40, 51

[56] References Cited

U.S. PATENT DOCUMENTS

| | | | |
|---|---|---|---|
| 4,866,686 | 9/1989 | Verboom | 369/275.1 |
| 5,126,991 | 6/1991 | Verboom | 369/59 |
| 5,170,385 | 12/1992 | Senshu et al. | 369/275.3 |

OTHER PUBLICATIONS

Mass Format Technical Explanation, Apr. 29, 1991 from LMSI.

Primary Examiner—Donald Hajec
Assistant Examiner—T. N. Forbus, Jr.
Attorney, Agent, or Firm—David R. Treacy

[57] ABSTRACT

The beginning of a segment within a track of a record carrier, having a plurality of frames in each segment, is identified by detecting the presence of a control mark at a given position near the beginning of a frame, and the absence of a control mark at an adjoining position at which a control mark will be found in all other frames of the segment. The other frames of each segment are free from a mark at the given position. The next bit position containing a mark, after the given position and its adjoining position, is the clock bit position used for bit clock synchronization. An apparatus for reading these marks may include a qualification circuit for evaluating the magnitude of the difference in detector output at the given bit position and the adjoining bit position.

14 Claims, 2 Drawing Sheets

OPTICAL DATA RECORDER WITH SEGMENT SYNCHRONIZATION MARKS

BACKGROUND OF THE INVENTION

1. Field of the Invention

The invention relates to the field of data recording on optical discs, and more particularly to methods of locating a portion of a track identified by an address.

Data are recorded in tracks which are concentric circles, or in spiral tracks where the track pitch is very small compared with the track radius so that the track may be considered a circle for addressing purposes. Typically each track itself is divided into segments or sectors, and each of these is in turn divided into frames. The frame is really the basic unit for data retrieval, because it frame is essentially self-contained: it generally begins with a "servo" field which contains control marks or pre-formatted pits defining the track centerline, clock and frame synchronizing information, and frame address information.

Because of the large number of frames which may be recorded on a disc, a significant portion of the total space may be occupied by addresses. Because these addresses become longer as more frames are squeezed onto a disc, locating a particular position as an optical head moves across the disc becomes increasingly difficult.

2. Description of the Prior Art

U.S. Pat. No. 5,126,991 discloses a technique for speeding identification of a location on the disc by using a "creeping" code for the address. With this technique successive addresses are represented by respective code words differing in one bit position only. This improves the reliability of identifying the address when the scanning beam is not locked onto the center of a particular track.

As taught in the '991 patent, to speed identification and correction of errors, track addresses may be repeated in different locations along the track. Accuracy may be further improved by multiplexing the address: it is split into parts, and so-called servo areas of individual frames contain only one of these parts.

A particular improved technique for identifying locations on a disc is disclosed in ANSI document X3B11/91/300-043, dated Apr. 29, 1991. The MASS FORMAT described therein uses address nibbles which are pre-formatted in servo areas of successive frames. When a creeping code is used, the part of the address which is incrementing can be used as a segment address. To do this it is necessary to establish segment synchronization, by reading and decoding enough address nibbles that the respective frame locations in the segment can be known; from this information the position of the beginning of the segment can then be determined. After this synchronization, a microprocessor can then determine where the other address bytes in the sequence are located.

SUMMARY OF THE INVENTION

The object of the invention is to improve the speed of segment synchronization by performing it in the drive electronics, before decoding.

According to the invention, segment synchronization is obtained by a minor deviation in the first control mark or pit positioning in the first frame of each segment. Rather than starting each frame with a "cosine" pit which is fixed in the fourth position, or alternates between the third and fourth positions, the cosine pit is replaced by a BOS (beginning of segment) pit which is in position "3" of frame 0 (the first frame) of each segment, and in position "4" in the subsequent frames of that segment.

When reading a data disc according to the invention, if clock and frame synchronization had been achieved, segment synchronization is achieved the instant that the fourth bit of frame 0 has been read.

In a preferred embodiment, a qualification circuit check the signal amplitudes of both positions "3" and "4". If they are within a certain range of difference, then the reading is presumed valid.

In yet another embodiment, BOS-Logic circuitry checks whether or not the BOS pulses occur at the correct interval, by counting the number of frames or channel bits between BOS pulses. If, due to an error or defect a BOS pulse is missing, it can be inserted at the correct instant by the BOS-Logic.

In still another embodiment of the invention, upon receipt of a "Search for Synch" command, the BOS-Logic looks for the first valid BOS pulse (position "3"). Upon detection of a BOS pulse, a frame counter is reset. For a 12-frame segment, after 12 frames the frame counter sends a BOS-interrupt to the microprocessor at the beginning of each frame 0. The microprocessor then checks the address bytes it receives from the address decoder. If the segment address bytes are incrementing, synchronization is verified and the frame counter continues cycling from 0 through 11. If the microprocessor cannot make sense out of the address bytes being received, then another "Search for Sync" command is issued.

DESCRIPTION OF THE PREFERRED EMBODIMENT

Figure 1:
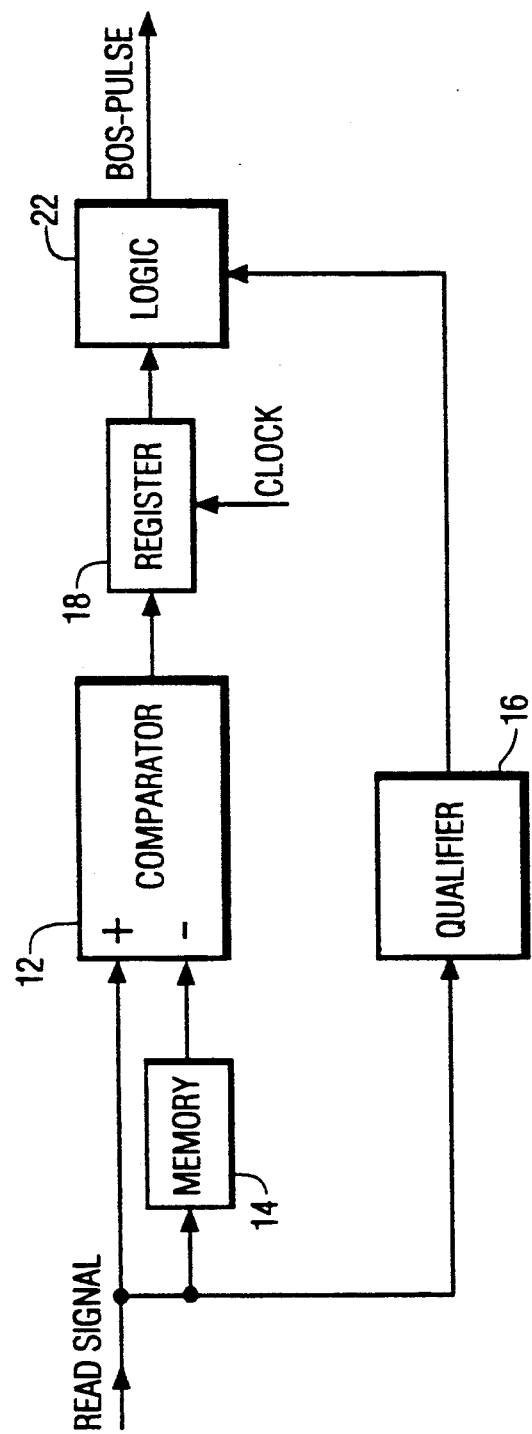
FIG. 1 is a block diagram of a BOS-Logic circuit according to the invention.

As shown in FIG. 1, the detected read scanning signal is provided to a comparator 12, a memory 14 and a qualifier circuit 16. The memory 14 may be, for example, a sample-and-hold circuit, or a simple delay of one bit clock period. The comparator 12 output is provided to a register 18 which is clocked shortly after the position "4" signal is received at the comparator input.

BOS-Logic circuit 22 receives the register 18 output, and checks whether or not the BOS-pulses are occurring at the correct interval by counting the number of frames or the number of bits between BOS pulses. According to one aspect of the invention, after segment synchronization is achieved, if a BOS pulse is missing from the bit stream from the detector, for example as a result of a medium defect, the BOS-Logic will insert a BOS pulse at the correct instant.

Qualifier circuit 16 measures the actual signal amplitudes for both positions "3" and "4". If their values are not respectively above and below given thresholds, the comparator output is ignored.

Figure 2:
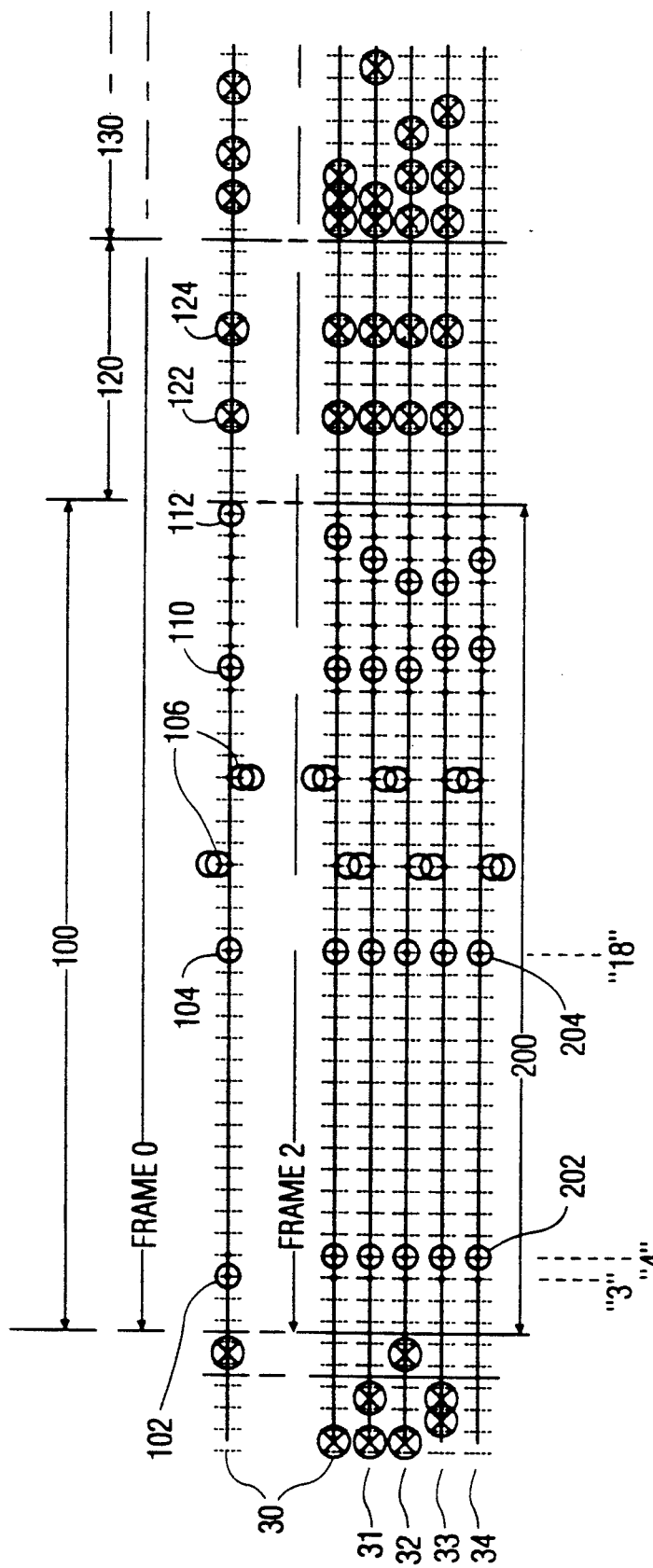
FIG. 2 is a bit timing diagram for a record carrier according to the invention.

FIG. 2 shows the relative timing of the servo fields according to the invention. Part of frame 0 of a segment of track 30 is shown above the corresponding bit positions of a later frame of that segment and its adjacent tracks 31-34. The servo field 100 of frame 0 has a BOS pit 102 in clock position "3", and a clock pit 104 in position "18". Wobbled tracking pits 106 are placed to alternate sides of the track 30 centerline, and address nibble pits 110 and 112 are preformatted in the last 8 bit positions of the servo field. These address nibbles are preferably arranged in a creeping code, so that only one or two bit transitions occur between one track and each adjoining track. This arrangement, as is known, speeds track identification during search for a given track.

A reference field 120 contains two reference marks 122 and 124 which are recorded, to provide a reference for setting the detection threshold. The data field 130 contains data which are, preferably, recorded in a 1,7 run-length-limited (RLL) code.

Frame 2 of tracks 30-34 contains pits and marks in corresponding places, except for the first pit 202. To distinguish this pit, which can function as a cosine pit, from the BOS pit 102, the pit 202 is formed in bit position "4". The clock pit 204 is formed in the same bit position "18" as in the other frames except for the first frame of each segment.

Those of ordinary skill in the art will recognize that the invention is applicable to many other code and format arrangements. For example, the codes, bit positions, and numbers of consecutive pits or blanks are relatively arbitrary. The invention is not limited to use with wobbled tracking servo pits, nor addresses provided in nibbles. However, the invention is most applicable to address coding schemes in which a frame number is not fully defined in its address. Such schemes minimize the length of the servo field, but require the inventive segment synchronization in order to provide rapid lock-on when searching for a given segment. Accordingly, the invention is measured solely by the appended claims.

What is claimed is:

1. A method of reading recorded data from a record carrier, comprising the steps of:
   providing a record carrier having data recorded thereon in a pattern of marks arranged in parallel tracks, each track being divided into a plurality of segments, each segment being subdivided into a plurality of frames; at least some of said frames having data recorded therein in patterns of marks formed at bit positions, and each frame having a control field at least adjacent the first bit position containing control marks defining the location of the track and identifying the frame; and two of said control marks in each control field being spaced a distance free of other marks, greater than the distance between any other adjoining marks in that control field or in any of said patterns,
   scanning marks in at least one of said control fields, and
   responsive to said scanning, determining the location of the first frame in the segment containing said at least one of said control fields,
   characterized in that the first frame in each segment comprises a control mark in a given position, all other frames in said segment being free from a control mark in said given position, and
   the determining step comprises detecting said control mark in said given position.

2. A method as claimed in claim 1, wherein the second of said two control marks is used for synchronizing a bit position clock, characterized in that said control mark in said given position is the first of said two control marks.

3. A method as claimed in claim 2, comprising the further steps of:
   generating a BOS pulse responsive to detection of said control mark in said given position.
   continuing to scan along the track containing said segment containing said at least one of said control fields,
   determining the bit location which is the next said given position,
   detecting the presence or absence of a control mark in said next given position, and
   responsive to the absence of such control mark, generating a next BOS pulse synchronized to correspond to said next given position.

4. A method as claimed in claim 3, characterized in that said determining step comprises counting bit positions from said given position in synchronism with scanning along the track.

5. An apparatus for reading data recorded on a record carrier in a pattern of marks arranged in parallel tracks, each track being divided into a plurality of segments, each segment being subdivided into a plurality of frames; at least some of said frames having data recorded therein in patterns of marks formed at bit positions, and each frame having a control field at least adjacent the first bit position containing control marks defining the location of the track and identifying the frame; and two of said control marks in each control field being spaced a distance free of other marks, greater than the distance between any other adjoining marks in that control field or in any of said patterns,
   said apparatus comprising means for scanning marks in at least one of said control fields, and
   means, responsive to said scanning, for determining the location of the first frame in the segment containing said at least one of said control fields,
   characterized in that, for reading such a carrier in which the first frame in each segment comprises a control mark in a given position, all other frames in each segment being free from a control mark in said given position, said means for determining comprises means for detecting the presence of said control mark in said given position.

6. An apparatus as claimed in claim 5, for reading a said carrier in which the second of said two control marks is a clock bit position,
   characterized in that the apparatus comprises means for detecting the absence of a control mark in a bit position immediately adjoining said given position, and
   means, responsive to the detection of the presence of said control mark in said given position, and the absence of a control mark in said bit position immediately adjoining, for generating a BOS pulse responsive to detection of said control mark in said given position.

7. An apparatus as claimed in claim 6, comprising means, responsive to continued scanning along the track containing said segment containing said at least one of said control fields, for determining the bit location which is the next said given position,
   means for detecting the presence or absence of a control mark in said next given position, and
   means, responsive to the absence of such control mark, for generating a next BOS pulse synchronized to correspond to said next given position.

8. An apparatus as claimed in claim 7, characterized in that said means for determining comprises a counter for counting bit positions from said given position in synchronism with scanning along the track.

9. An apparatus as claimed in claim 8, further comprising means for evaluating respective signals detected at one of said given positions and at the respective position next to said given position, and for inhibiting generation of a BOS pulse if said respective signals do not have a relationship falling within a given range.

10. An apparatus as claimed in claim 7, further comprising means for evaluating respective signals detected at one of said given positions and at the respective position next to said given position, and for inhibiting generation of a BOS pulse if said respective signals do not have a relationship falling within a given range.

11. An apparatus as claimed in claim 6, further comprising means for evaluating respective signals detected at one of said given positions and at the respective position next to said given position, and for inhibiting generation of a BOS pulse if said respective signals do not have a relationship falling within a given range.

12. An apparatus as claimed in claim 5, further comprising means for evaluating respective signals detected at one of said given positions and at the respective position next to said given position, and for inhibiting generation of a BOS pulse if said respective signals do not have a relationship falling within a given range.

13. A record carrier having data recorded thereon in a pattern of marks arranged in parallel tracks, each track being divided into a plurality of segments, each segment being subdivided into a plurality of frames; at least some of said frames having data recorded therein in patterns of marks formed at bit positions, and each frame having a control field at least adjacent the first bit position containing control marks defining the location of the track and identifying the frame; and two of said control marks in each control field being spaced a distance free of other marks, greater than the distance between any other adjoining marks in that control field or in any of said patterns, characterized in that the first frame in each segment comprises a control mark in a given position, all other frames in each segment being free from a control mark in said given position.

14. A carrier as claimed in claim 13, wherein the second of said two control marks is a clock bit position, characterized in that said control mark in said given position is the first of said two control marks.

* * * * *